United States Patent
Penttinen et al.

Patent Number: 5,840,385
Date of Patent: Nov. 24, 1998

[54] COVER FOR PRODUCT PACKAGE AND METHOD FOR PRODUCING SAME

[75] Inventors: Tapani Penttinen, Huutjärvi; Riitta Koskiniemi, Kyminlinna; Matti Salste, Imatra, all of Finland

[73] Assignee: Enso-Gutzeit Oy, Imatra, Finland

[21] Appl. No.: 912,753

[22] Filed: Aug. 18, 1997

Related U.S. Application Data

[63] Continuation of Ser. No. 471,067, Jun. 6, 1995, abandoned.

[30] Foreign Application Priority Data

Jun. 16, 1994 [FI] Finland ................................. 942877

[51] Int. Cl.$^6$ ........................... B32B 27/10; B65D 65/40
[52] U.S. Cl. ................... 428/36.7; 428/36.6; 428/474.7; 428/476.3; 428/478.8; 428/481; 428/511; 428/537.5; 220/260; 220/359
[58] Field of Search ................................. 428/36.6, 36.7, 428/474.7, 476.3, 478.8, 481, 511, 537.5; 220/260, 359

[56] References Cited

U.S. PATENT DOCUMENTS

| | | | |
|---|---|---|---|
| 4,927,689 | 5/1990 | Markiewicz | 428/4.8 |
| 5,449,552 | 9/1995 | Bochow et al. | 428/323 |

FOREIGN PATENT DOCUMENTS

| | | |
|---|---|---|
| A-0 144 999 | 6/1985 | European Pat. Off. . |
| A-0 309 095 | 6/1988 | European Pat. Off. . |
| A-0 377 935 | 7/1990 | European Pat. Off. . |
| 0 381 922 | 8/1990 | European Pat. Off. . |
| 7810511 | 8/1982 | Sweden . |
| 2 249 550 | 5/1992 | United Kingdom . |
| A-89 05320 | 6/1989 | WIPO . |
| A-92 04187 | 3/1992 | WIPO . |

*Primary Examiner*—Charles Nold
*Attorney, Agent, or Firm*—Pennie & Edmonds LLP

[57] ABSTRACT

The present invention relates to a cover (4) of a product package to be heat-sealed on the mouth of a product package and extractable therefrom when opening, and a method for manufacturing same. The cover is appropriate particularly for dosage packages of foodstuffs, such as milk, yogurt, juices and fruit syrups, desserts, etc., or for drug packages. The cover is made of paper (5) which is provided with polymer coating layers (6) on the undersurface, comprising a formally polymer binding agent layer and a heat-sealable polymer layer of an oxygen-tight, non-puncturable support layer, enabling extraction of the cover when opening the package. The essential feature in the invention lies therein that the support layer includes, as described above, a polymer component of high degree of crystallization and amorphous polymer component, wherewith the curling of the cover is prevented. Production of the cover (4) is accomplished with simultaneous extrusion of the polymer layers (6).

15 Claims, 1 Drawing Sheet

U.S. Patent   Nov. 24, 1998   5,840,385
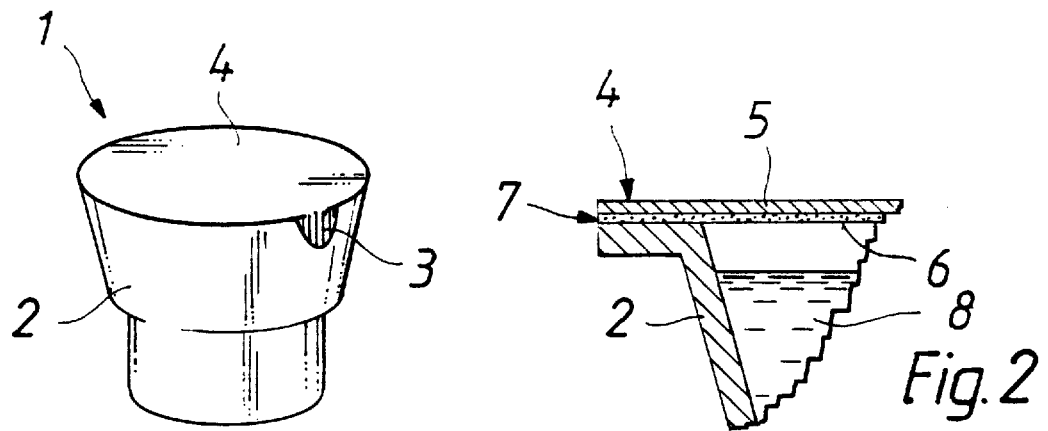
Fig.1
Fig.2
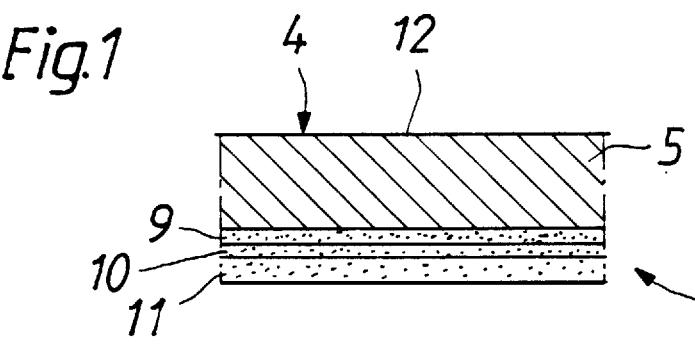
Fig.3
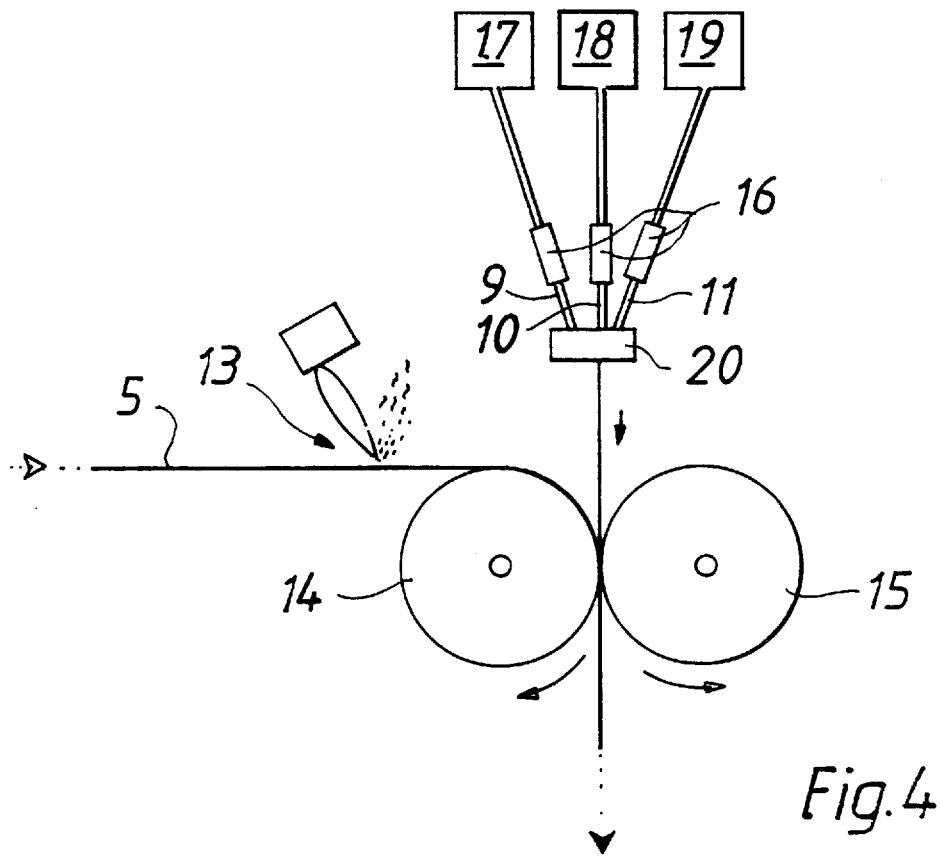
Fig.4

COVER FOR PRODUCT PACKAGE AND METHOD FOR PRODUCING SAME

This is a continuation of Ser. No. 08/471,067 filed Jun. 6, 1995 now abandoned.

FIELD OF THE INVENTION

The present invention relates to a cover to be heat-sealed on the mouth of a product package and to be pulled therefrom when opening the package, comprising a paper layer, an oxygen-impermeable polymer support layer thereunder, and undermost, a heat-sealed polymer layer, permitting pulling off of the cover after the sealing.

BACKGROUND OF THE INVENTION

Heat-sealed, extractable covers are used particularly in consumer and dosage packages. Typical products to be packaged in this manner include liquid foodstuffs, such as milk, sour whole milk, yogurt, water, juices and fruit syrups, desserts, ice-cream, butter, margarine, and ready-to-eat food products. Also dry, powder-like or particle-like products, and tablets, such as drugs, are packaged similarly. The package itself is typically plastic, such as polypropylene or polystyrene, a paperboard coated with plastic like polyethylene, or glass. The material of the cover is of most commonly used aluminium foil sealed with varnish on the mouth of the package.

Significant advantage of an aluminium cover is its tightness and hygiene. The cover prevents penetration of air oxygen into the package and contamination of the product therethrough simultaneously as it prevents aromas from escaping from the package. A problem related to the aluminium cover is, however, that it tends to break and puncture. It is also difficult to detach the cover whole from the point of sealing. In addition, production of aluminium covers consumes a lot of energy, and the cover is undegradable in dumping sites.

In order to eliminate the above-described problems, endeavours have been made to replace aluminium foil cover with paper covers in covers. In order to provide oxygen tightness in a paper cover, the paper has been provided with a polymer layer on the side facing the mouth of the package. A paper cover can be detached from the mouth of a package more readily than an aluminium cover. In addition, it is not punctured through as readily as that by an impact thereon. Achieving adequate oxygen-impermeability in a paper cover has, however, been more problematic. However, a design which is appropriate for use in this sense is disclosed in Finnish patent application No. 914268, that is, a heat-sealable, extractable paper cover comprises a polymer binding agent layer in the form of coating layers under the paper, a polymer support layer to stop oxygen penetration, a second polymer binding agent layer, and a heat-sealable polymer layer. The polymer material of the support layer can be ethylene vinyl alcohol copolymer (EVOH), polyethylene terephthalate (PET) or polyamide (PA), and a modified polyethylene compatible with the EVOH layer, a grafted polyethylene compatible with the PET layer, and a copolymer of ethylene and unsaturated carboxyl acid compatible with the PA layer are mentioned as binding agents. For the material of the heat-sealing layer, a mixture of polyethylene modified with methacrylic acid and ethylene vinyl acetate acting as adhesive agent and of ethylene methacrylic acid acting as release agent is introduced. As taught by said patent application, the polymer coating layers to be applied on the paper are produced by extrusion.

A drawback of the extractable paper covers of a package according to Finnish-application No. 914268 is, however, the curling tendency of the cover material on the paper along with the shrinking of the extruded polymer layers. The curling covers generate problems in a packaging machine in which a suction cup transfer covers one at a time from a stack to the mouth of a package to be closed. The operation of the machine necessitates that the cover has to be even so that the suction cup is capable of engaging one cover at a time only and that the cover must be precisely at the point of incidence. Problems related thereto arise particularly in packaging dairy products in dairies where the high level of moisture in the air tends to increase the curling problem.

BRIEF SUMMARY OF THE INVENTION

The object of the present invention is to eliminate said problem occurring in the extractable covers of packages disclosed in application No. 914268 by producing a cover which is even and will not therefore generate interference in the operation of a packaging machine. A paper cover to be heat-sealed and extracted from a package according to the present invention is characterized in that the oxygen-tight support layer under the paper layer has been produced by mixing a polymer component of high crystallization degree and an amorphous polymer component together.

According to the invention, it is found that the curling problems are related to the crystalline polymer used in the support layer of the cover. A crystalline polymer is mechanically secure and provides the non-bursting property required in the cover. In extrusions, the crystalline polymer is, however, in molten state and in recrystallization state thereafter. During recrystallization, the polymer shrinks, which, as is assumed, causes the curling. On the other hand, the amorphous polymer is neither crystallized nor does it curl the paper, but an obstruction for its use is its mechanical weakness. However, the problems are solved, according to the invention, using a highly crystalline polymer and amorphous polymer mixed together, which results in a cover which is both mechanically strong enough and non-curling. A cover according to the invention operates faultlessly in a packaging machine, it is heat-sealed in a wide temperature range, it is not readily punctured, and it can be detached without tearing when opened, even if the tightness of the sealing were stricter than optimal.

It is well known in the art that crystallization occurs in a plurality of both different aliphatic polymers and polymers containing annular structures. A polymer component of high crystallization degree generally refers to such polymer material in which the degree of crystallization varies in the range of about 30 to 60%, preferredly about 40 to 50%, depending on the material.

In a cover according to the invention, polyamide (PA), polyethylene terephthalate (PET), polypropylene (PP) or ethyl vinyl alcohol copolymer (EVOH) can be used as the crystalline polymer of the oxygen-tight support layer, and for amorphous polymer, polyamide (PA), a copolymer, such as ethylene methacrylic acid copolymer (EMA) or amorphous polyethylene terephthalate (APET). According to a preferred embodiment of the invention, the support layer is comprised of a mixture of crystalline polyamide and amorphous polyamide. Also a mixture of crystalline polyamide and amorphous ethylene methacrylic acid copolymer has been found highly advantageous. The mixing ratio of the polymer components in the support layer can be 20 to 90, preferably 40 to 80, and most preferably about 70 wt-% of the crystalline polymer component, and 10 to 80, preferredly 20 to 60, and most preferredly about 30 wt-% of the amorphous polymer component.

In a cover according to the invention, styrene-modified ethylene copolymer acting in the layer as a detaching means can preferably be used for the polymer material of the heat-sealed layer of the cover. For a second monomer of said copolymer, in addition to ethylene, methacrylic acid or butyl acrylate can be used. An appropriate composition of the heat-sealed layer contains 5 to 60, preferredly about 20 wt-%, of styrene-modified ethylene copolymer, and 40 to 95, preferredly about 80 wt-%, of ethylene copolymer acting as the adhesive agent. An advantage of said blend is the wide heat-sealing temperature range, about 110° to 220° C., and adhesiveness to various package materials.

For adhering the support layer and the heat-sealing layer together, a separate polymer binding agent layer may be needed therebetween, depending on the materials used. As a binding agent compatible with the PA/PA or PA/EMA mixtures of the support layer and the styrene-modified ethylene copolymer of the heat-sealing layer, an ethylene copolymer modified with maleic acid anhydride may be mentioned. Otherwise, binding agents as those disclosed in the Finnish application No. 914268 and mentioned above can be used in the binding agent layer.

The present invention also relates to a use of a paper-based cover to be heat-sealed and extracted as above in a foodstuff, drug or cosmetic package, and a production method of the same. The last mentioned is characterized in that the polymer materials of the support layer, of the potential binding agent layer and of the heat-sealing layer are extruded as continuous film webs, they are made to face one another and conducted on a paper layer whereto they are adhered.

BRIEF DESCRIPTION OF THE SEVERAL VIEWS OF THE DRAWINGS

The invention is described below in more detail with the aid of examples, referring to the accompanying drawing, in which FIG. 1 presents a yogurt package provided with a cover of the invention, FIG. 2 is a cross-section of the seal of the package shown in FIG. 1 and the cover closing said package, FIG. 3 is a cross-section of a portion of the cover of the package on an enlarged scale, and FIG. 4 presents schematically the production process of the cover material.

DETAILED DESCRIPTION OF THE INVENTION

FIG. 1 presents a disposable dosage package 1 for liquid foodstuff, such as yogurt. The package 1 comprises a vessel 2 and a cover 4 heat-sealed on the mouth thereof and opened by pulling at handle 3.

The container 2 can be made of any plastic used generally in foodstuff packages, such as polypropylene or polystyrene, or alternatively, paper-board covered with e.g. LD polyethylene.

The tightness of the container material is preferably at least the same as of the cover of the package.

The heat-sealed cover 4 of the package comprises, as shown in FIG. 2, a paper layer 5 and thereon, a polymer combination 6 to be within the package, comprised of three polymer layers on top of one another, the innermost whereof forming the heat-seal 7 between the edge of the container 2 and the cover 4. In addition to the heat-sealability, the polymer coating 6 enables easy openability of the cover as well as tightness preventing a packaged product 8 from becoming deteriorated.

The polymer layers used as the internal coating 6 of the cover paper 5 can be seen in FIG. 3. Closest to the paper 5 is located a support layer 9, which is of a non-puncturable polymer material obstructing oxygen penetration, a polymer binding agent layer 10 thereunder, and lowermost, a polymer layer 11 forming the heat-seal 7. The last mentioned layer is preferredly formed by a polymer mixture comprising an adhering agent enabling heat-sealing, and a release agent enabling opening of the cover without being torn at the heat-seal. On the top surface opposite to the polymer layers 9 to 11, the cover paper 5 is provided with a mineral coating 12 to improve the printability.

As taught by the invention, the oxygen-tight, non-puncturable support layer 9 contains crystalline polymer, such as polyamide, and an amorphous polymer, such as polyamide or ethylene methacrylic acid copolymer, as a mixture. A crystalline polymer is a polymer component having a high degree of crystallization. The heat-seal layer 11 may contain ethylene copolymer serving as an adhesive and styrene-modified ethylene copolymer used as release agent. For the material of the binding agent layer 10, polyethylene modified with maleic acid anhydride can be used. However, other material combinations, such as those mentioned above are conceivable.

Production of a cover of a product package according to the invention is accomplished as a continuous process as shown in FIG. 4 by means of corona treatment 13 on paper 5 and by conducting it between the rolls 14,15 as a web, to which the overlapping polymer layers 9 to 11 of the cover are conducted simultaneously from nozzles 16. The nozzles 16 are in association with the containers 17 to 19 from which the binding agent (container 18), the polymer mixture for the support layer (container 17), and the polymer to be heat-sealed (container 19) are supplied as continuous webs 9–11 in molten state at about 110° to 220° C. into the nozzles. The quantity of polymer material in the web 9 can be about 20 g/m², in the web 10 about 5 g/m² in the web 11 about 20 g/m², the weight of paper 5 being about 40 to 80 g/m². The quantitites may, however, vary, e.g. in web 11, depending on the width of the heat-seal (a narrower seal requires a thicker material layer in order to guarantee the sealing). According to FIG. 4, the molten polymer webs 9–11 are conducted into a divider piece 20 the function of which is to bring them against one another, whereafter they are adhered in one time on the paper 5 in the gap between the rolls 14,15. This operation results in a coated paper web from which the covers according to the invention can be cut off either prior to the fill-in and the heat-sealing phase of the package, or in conjunction thereof.

It is obvious to a person skilled in the art that diverse embodiments of the invention are not limited to what is presented above, but they may vary within the scope of the accompanying claims. Depending on the polymer materials used, a separate binding agent layer may be needed between the paper layer 5 and the support layer 9, or alternatively, a binding agent layer 10 between the support layer 9 and the heat-sealing layer 11 can be omitted, which would reduce the number of the extruded layers to two. The shape of the package may also vary, and e.g. in packages of edible fats, the cover of the invention may serve as an internal protective cover of the container and of a separate topmost cover to be opened and closed, this being taken off when opening the package for the first time. The cover of the invention may serve as a similar protective cover also in plastic or glass cans provided with threaded lids. Products in question to be packaged therein may include various foodstuffs, such as milk, soured whole milk, yogurt, juices and fruit syrups, desserts, ice-cream, butter, margarine, and processed foodproducts, drugs, cosmetic products, and equivalent.

We claim:

1. A cover (4) to be heat-sealed on the mouth of a product package (1) and extracted therefrom when opening the package, comprising a paper layer (5), a polymer heat-sealing layer (11), and a non-curling polymer support layer (9) forming a barrier against oxygen disposed therebetween, said polymer heat-sealing layer (11) permitting extraction of the cover after said heat sealing on the mouth of said product package, and said polymer support layer (9) including a crystalline polymer component of high degree of crystallization and an amorphous polymer component to render said cover non-curling.

2. The cover according to claim 1, wherein the crystalline polymer component (9) is selected from the group consisting of polyamide (PA), polyethylene terephthalate (PET), polypropylene (PP), and ethyl vinyl alcohol copolymer (EVOH).

3. The cover according to claim 1, wherein the amorphous polymer component (9) is selected from the group consisting of polyamide (PA), ethylene methacrylic acid copolymer (EMA), and amorphous polyethylene terephthalate (APET).

4. The cover according to claim 1, wherein the support layer (9) contains crystalline polyamide and amorphous polyamide.

5. The cover according to claim 1, wherein the support layer (9) contains crystalline polyamide and amorphous ethylene methacrylic acid copolymer.

6. A cover (4) to be heat-sealed on the mouth of a product package (1) and extracted therefrom when opening the package, comprising a paper layer (5), a polymer heat-sealing layer (11), and a non-curling polymer support layer (9) forming a barrier against oxygen disposed therebetween, said polymer heat-sealing layer (11) permitting extraction of the cover after said heat sealing on the mouth of said product package, wherein the support layer (9) includes a mixture of 20 to 90 wt-% crystalline polymer component of high degree of crystallization, and 10 to 80 wt-% amorphous polymer component to render said cover non-curling.

7. The cover according to claim 1, further comprising a polymer binding agent layer disposed between the support layer (9) and the heat-sealed layer (11).

8. The cover according to claim 1, wherein the heat-sealed layer (11) includes a mixture of 5 to 60 wt-% styrene-modified ethylene copolymer acting as a release agent, and 40 to 95 wt-% ethylene copolymer acting as an adhesive agent.

9. The cover according to claim 1, wherein the crystalline polymer component (9) is selected from the group consisting of polyamide (PA), polyethylene terephthalate (PET), polypropylene (PP), and ethyl vinyl alcohol copolymer (EVOH) and the amorphous polymer component (9) is selected from the group consisting of polyamide (PA), ethylene methacrylic acid copolymer (EMA), and amorphous polyethylene terephthalate (APET).

10. The cover according to claim 5, wherein the support layer (9) includes a mixture of 40 to 80 wt-% crystalline polymer component and 20 to 60 wt-% amorphous polymer component.

11. The cover according to claim 8, wherein the heat-sealed layer (11) includes a mixture of about 20 wt-% styrene-modified ethylene copolymer and about 80 wt-% ethylene copolymer.

12. A cover in combination with a product package having an opening with a periphery along which said cover is to be heat-sealed, the cover comprising:

a paper layer;

a polymer heat-sealing layer removably heat sealed to the periphery of the opening of said package; and a non-curling polymer support layer impermeable to oxygen and having opposite sides disposed between said paper layer and said polymer heat-sealing layer, said polymer support layer comprising a mixture of a crystalline polymer component and an amorphous polymer component, in amounts preventing curling of said cover prior to heat sealing to said package.

13. The combination according to claim 12, wherein the non-curling polymer support layer includes a mixture of 20 to 90 wt-% crystalline polymer component and 20 to 80 wt-% amorphous polymer component.

14. The combination according to claim 13, wherein the crystalline polymer component is selected from the group consisting of polyamide (PA), polyethylene terephthalate (PET), polypropylene (PP), and ethyl vinyl alcohol copolymer (EVOH).

15. The combination according to claim 14, wherein the amorphous polymer component is selected from the group consisting of polyamide (PA), ethylene methacrylic acid copolymer (EMA), and amorphous polyethylene terephthalate (APET).

* * * * *

UNITED STATES PATENT AND TRADEMARK OFFICE
CERTIFICATE OF CORRECTION

PATENT NO. : 5,840,385

DATED : November 24, 1998

INVENTOR(S) : Penttinen et al.

It is certified that error appears in the above-identified patent and that said Letters Patent is hereby corrected as shown below:

Column 1, line 41: delete "in covers";

Claim 10: replace "5" with --6--.

Signed and Sealed this

Thirteenth Day of April, 1999

Attest:

Q. TODD DICKINSON

*Attesting Officer*  *Acting Commissioner of Patents and Trademarks*